United States Patent
Laumen et al.

(10) Patent No.: US 8,131,824 B2
(45) Date of Patent: Mar. 6, 2012

(54) METHOD FOR THE TRANSMISSION OF MULTIMEDIA DATA UTILIZING A SIGNALING SIGNAL IN A TELECOMMUNICATIONS NETWORK

(75) Inventors: Josef Laumen, Hildesheim (DE); Andreas Schmidt, Braunschweig (DE); Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 2377 days.

(21) Appl. No.: 10/486,284

(22) PCT Filed: Aug. 1, 2002

(86) PCT No.: PCT/EP02/08598
§ 371 (c)(1),
(2), (4) Date: Feb. 9, 2004

(87) PCT Pub. No.: WO03/015429
PCT Pub. Date: Feb. 20, 2003

(65) Prior Publication Data
US 2004/0249864 A1    Dec. 9, 2004

(30) Foreign Application Priority Data
Aug. 9, 2001 (EP) .................................. 01119271

(51) Int. Cl.
*G06F 15/16* (2006.01)
(52) U.S. Cl. ......... 709/219; 709/216; 709/217; 709/218
(58) Field of Classification Search .................. 709/219, 709/227, 205, 204, 216, 217, 218; 370/328, 370/401, 260
See application file for complete search history.

(56) References Cited

U.S. PATENT DOCUMENTS

| 4,972,462 | A  | * | 11/1990 | Shibata | 379/88.13 |
|---|---|---|---|---|---|
| 5,500,859 | A  | * | 3/1996 | Sharma et al. | 370/468 |
| 6,044,205 | A  | * | 3/2000 | Reed et al. | 709/201 |
| 6,064,723 | A  | * | 5/2000 | Cohn et al. | 379/88.14 |
| 6,070,053 | A  |  | 5/2000 | Yamashita | |
| 6,885,870 | B2 | * | 4/2005 | Aho | 455/466 |
| 2003/0073450 | A1 | * | 4/2003 | Laumen et al. | 455/466 |
| 2003/0135867 | A1 | * | 7/2003 | Guedalia | 725/126 |

FOREIGN PATENT DOCUMENTS

| JP | 2000168914 A | 6/2000 |
|---|---|---|
| WO | WO 99/25107 | 5/1999 |
| WO | 0064110 A1 | 10/2000 |

* cited by examiner

*Primary Examiner* — Jeffrey Pwu
*Assistant Examiner* — Abdelnabi Musa
(74) *Attorney, Agent, or Firm* — King & Spalding L.L.P.

(57) ABSTRACT

The invention aims at providing a method, a subscriber terminal, a computer program product and a communication system, wherein a sender has the possibility of influencing the signaling signal in a terminal of a recipient and configuring individually and with greater freedom a signaling signal by choosing one or more data formats that can be sent in an MM standard, particularly when transmitting an MM. According to the invention, this is achieved in that an element causing immediate display of said element is identified as a signaling signal (S) when the data and/or a predetermined partial amount of data have arrived.

31 Claims, 3 Drawing Sheets

*X-Mms-Signaling-Element*: (0x87)
Signalling-Element-Value = Text-String

Fig. 4

*X-Mms-Content-ID (0x19)*
X-Mms-Content-ID-value = Text-string | X-Mms-Content-general-form
X-Mms-Content-general-form = Value-length Text-string *(Parameter)

Fig. 5

| Parametername | Binärwert des Parameternamens | Parameterwert |
|---|---|---|
| Name | 0x00 | Text-string |
| Type | 0x01 | Constrained-encoding |
| Size | 0x02 | Integer-value |
| External-Link | 0x03 | Yes (<Octet 128>) \| No (<Octet 129>) |
| External-Link-Size | 0x04 | Integer-value |
| Related-ID | 0x05 | Text-string |
| Original-Type | 0x06 | Constrained-encoding |
| Original-Size | 0x07 | Integer-value |
| Signaling-Element | 0x08 | Yes (<Octet 128>) \| No (<Octet 129>) |

Fig. 6 ical components.
METHOD FOR THE TRANSMISSION OF MULTIMEDIA DATA UTILIZING A SIGNALING SIGNAL IN A TELECOMMUNICATIONS NETWORK The present invention relates to a method for the transmission of data according to the preamble of Claim 1, a subscriber terminal, a computer program product and a communication system. The term data in the context of the present invention refers to any type of information that is made up of individual components. These individual components or elements can be set up, organized and/or coded according to various standards. In this sense therefore data can also represent a multimedia message that comprises various elements of different standards.

Methods and devices are known for transmitting different data forms or formats. A mobile radio system according to the Global System for Mobile Communications Standard, abbreviated to GSM, for example offers not only voice telephony but also the possibility of sending or receiving information in the form of short text messages up to 160 characters long. This service is known as the Short Message Service, abbreviated to SMS.

For the next generation mobile radio system, the Universal Mobile Telecommunication System or UMTS, a multimedia-capable variant of a mobile message service is currently standardized, known as the Multimedia Messaging Service or MMS, see 3GPP TS 23.140 version 4.3.0, release 4, June 2001, $3^{rd}$ Generation Partnership Project, Technical Specification Group Terminals, Multimedia Messaging Service (MMS), Functional Description, Stage 2 and 3GPP TS 22.140 v 4.1.0 (June 2001), $3^{rd}$ Generation Partnership Project, Technical Specification Group Services and System Aspects, Service Aspects, Stage 1, Multimedia Messaging Service.

For better demarcation in respect of SMS text messages, information in the form of messages with a multimedia content is referred to below simply as multimedia messages, abbreviated to MM. Unlike SMS, with the multimedia message service MMS there is no restriction to pure text content. In an MMS it will also be possible to format texts to individual taste and to embed any content in a message. This includes for example audio and video content, still images, graphics, texts, etc. The doctrine disclosed below generally relates to quantities of data that are made up of individual elements of text and/or image data with or without sound, each being coded according to the same or different standards, even if a major area of use can be discerned for the present invention in applications according to the standard referred to above.

According to the prior art, implementation of MMS is only feasible using the Wireless Application Protocol WAP. To bridge the air interface between an MMS-capable terminal and the WAP gateway the use of a WAP Wireless Session Protocol WSP is provided for, see WAP-209-MMS Encapsulation, Wireless Application Protocol; WAP Multimedia Messaging Service; Message Encapsulation; MMS proposed version June 2001 and 3GPP TS 23.140 version 4.3.0, release 4; Third Generation Partnership Project; Technical Specification Group Terminals; Multimedia Messaging Service (MMS); Functional Description; Stage 2.

An MM essentially comprises a header and a data section. The header is made up of defined header fields and contains general information about the MM. The data section of an MM can contain one or more elements of different data types and data formats in any sequence. As already known from the field of electronic data processing, the actual multimedia content is relatively large, so it takes up a significant amount of storage space and also requires either large line capacities or long transmission times when transmission takes place.

A further feature of the MMS that can be derived from the properties disclosed above is that for delivery of MMs a distinction is made between what is known as PUSH mode, in which an incoming MM is delivered immediately to the recipient, and what is known as PULL mode, in which the recipient first has to be informed of a newly arrived MM by means of a notification. In PULL mode recipients can decide themselves in response to the notification whether or when they download this MM to their terminal. In other words in PULL mode recipients can also download the MM at a low charge rate time. If more than one MM is waiting, recipients can also determine an order of respective importance without blocking the receipt of even more important information.

In both modes however it is necessary for recipients themselves to be able to discern the delivery of an MM in PUSH mode or the arrival of a notification in PULL mode. In modern telephones a plurality of ringtones are now stored to identify a call, from which the user can select one or a plurality for incoming calls or SMS text messages. In some cases the terminal even supports the merging of callers into caller groups. In this case a shared ringtone can be assigned to a plurality of different callers, said ringtone being different from the ringtone for all other calls or other services, such as SMS text messages. However, all signaling signals currently used have in common the fact that they are stored in the recipient's terminal. Therefore only the recipient determines their assignment and/or use, the caller or sender has no influence on this.

The object of the present invention is to provide a method, a subscriber terminal, a computer program product and a communication system, wherein the sender has the possibility of influencing the signaling signal in a terminal of a recipient and configuring a signaling signal individually and with great freedom by choosing one or more data formats that can be sent in an MM standard particularly when transmitting an MM.

This object is achieved according to the invention by a method with the features of Claim 1 and a subscriber terminal with the features of Claim 25. This object is also achieved by means of a computer program product according to Claim 27 and a communication system according to Claim 29. The subclaims each define preferred and advantageous embodiments of the present invention.

A method according to the invention for the transmission of data in a communication system, in particular for the transmission of text and/or image data with or without sound, whereby a quantity of data to be transmitted is made up of individual elements, each of which is coded according to the same or different standards, is thereby characterized in that an element is identified to initiate immediate display of this element on arrival of the data and/or a predefined subset of the data. At least one predefined element of any standard from a set of data to be transmitted is therefore automatically opened as a signaling signal, so that the recipient no longer hears a preset signal as in the case of an incoming telephone call. The immediately opened element can for example, at the sender's discretion, use any audio content to alert the recipient in an individual manner to a newly arrived multimedia message. A method according to the invention can advantageously be used in both PUSH and PULL modes.

In a development of the invention the data to be sent is prepared so that it comprises a header for the transport of organization information and a body for the transport of any useful information. The useful information thereby preferably comprises elements in the form of a plurality of data packets. A method according to the invention is thereby preferably used for data that is transmitted as a multimedia message MM in a multimedia message service MMS, in particular to a mobile subscriber terminal or specifically a WAP-capable mobile telephone as what is known as the MMS User Agent.

Even in MMS it is at present not possible for information about signaling on arrival of an MM with a recipient to be written to the receiving User Agent by a sender. According to the invention it is now possible to refer to an element contained in the MM so that a signaling signal for an MM can be specified precisely by a sender to a recipient. As well as a text display any form of multimedia presentation, e.g. an audio sequence, still image or even a video sequence can therefore be defined as an introduction to run immediately at the start.

In a preferred embodiment of the invention a signaling signal comprises optical, acoustic and/or tactile elements. To reduce the quantity of data to be transmitted, when determining, describing or designing a signaling signal, elements are preferably accessed that are either permanently preinstalled in the receiving device or are already available or stored as a result of a previous transmission. Variations of such elements can then be produced by calling a respective element, e.g. by means of a name command for a specific element and transmission of a change vector or change and modification values. This means that the quantity of data required to transmit an individual signaling signal is greatly reduced, whereby diverse elements can continue to be combined with each other in any form.

Preferably in the context of the present invention the possibility is created in compliance with a standard of identifying in an MM of the multimedia messaging service MMS at least one object of the data section as a signaling signal at a receiving device or a receiving User Agent with the aim that this signal informs the recipient immediately at the same time as or during receipt by the receiving User Agent. For this purpose, in one development of the invention, there is provision for coding of the corresponding information in the MM. There are essentially two possibilities that are different in principle for identifying or referring to at least one specific multimedia component of an MM:

1. A specific identification number is assigned to each multimedia component of an MM, so that the individual components of an MM can be addressed individually. For this purpose an additional header field designated X-Mms-Content-ID is inserted for each MM element and this should contain the identification number of the corresponding MM element.

Methods for setting up a content ID or a uniquely assigned description for example are disclosed by the applicant in the European patent application with application number EP 01 101 057.6.

2. A header field may also contain a list of a plurality of parameters, see for example WAP-203-WSP, version 4 May 2000; Wireless Application Protocol, Wireless Session Protocol Specification; Chapter 8.4: "Header encoding". The header field X-Mms-Content-ID of an MM element is for example extended to include a set of parameters, such as identification number, name, element size, etc. so that each MM element can then be described precisely. This procedure is disclosed by the applicant in the European patent applications with application numbers EP 01 101 057.6 and developed in EP 01 107 278.2.

Depending on how the individual multimedia components of an MM are identified according to one of the two types set out above, there are also different possibilities for identifying an element of an MM according to the invention as a signaling signal:

a) If an MM element is identified according to the first possibility, it is possible to integrate a new header field with the possible designation X-Mms-Signaling-Element in the header of an MM, into which an identification number of that MM element or the plurality of elements can be written that is to serve as the signaling signal.

b) If an MM element is identified according to the second possibility, it is possible to supply a parameter at the same time within the header field proposed above with the designation X-Mms-Content-ID, in which a plurality of parameters can be listed for one element, with which parameter an MM element can be identified as a signaling signal. This parameter could for example be called the signaling element.

A header field can advantageously be coded in the same way as the field name and/or field value is coded. For specific forms of implementation appropriate to the applied standards, please refer to the embodiments, in which the respective advantages of the two possibilities set out above are shown in detail.

The identification according to one or a plurality of the above features is coded in one embodiment of the invention in the data of the MM. According to the WAP standard this relates in particular to the messages M-Send.req, M.Notification.ind and/or M-Retrieve.conf. The new header field can thereby be coded in combination with one possibility for identifying the MM elements, as defined in [3] for example. Alternatively a set of parameters can be extended in the header field of the specified WAP messages.

According to the WAP standard coding takes place preferably in the message M-Send.req. Coding therefore takes place centrally at the sender or sender application so that in a transmission chain disclosed below with reference to a diagram in the drawings no further modification of the data is subsequently required. Extraction and/or preparation of the signaling signal from an MM in particular as a separate signal in pull mode can be undertaken by a transmitter-side or recipient-side MMS Relay/Server and/or a receiving MMS User Agent. These two coding methods have in common the fact that tasks are relocated by the sender into the communication system. This introduces intelligence into a network, with the result that work can be speeded up and new methods or sub-methods can be implemented sender-side without retrofitting, as old methods are now exchanged centrally for new. Not least it is important that reducing the load on the recipient also saves said recipient's resources. This relates in particular to the batteries, which have to supply less energy for processing purposes because of this measure. Compression methods can also be used when transmitting data to accelerate the process and further relieve the load on the energy supply.

This means that an MM with a multimedia signaling signal can advantageously be inserted before an incoming call, in order to signal an incoming call and/or incoming multimedia data, for example to arouse interest in an immediate and/or complete download. A multimedia component of an MM identified by the sender as a signaling signal can then replace the signaling signal preset by a recipient in the receiving device, if this is permitted by a recipient. A method according to the invention is particularly advantageous if information about the size of the data awaiting transmission is added to a multimedia signaling signal at least in PULL mode. In this advantageous development of the invention an identified element or signaling signal is preferably transmitted to the receiving User Agent. In a preferred embodiment of the invention a predefined information element can then be used to assist with the decision whether the MM should be transmitted immediately, preferably and/or completely to the User Agent.

This method can therefore also be implemented generally in a communication system according to the invention using an acknowledgement message to the sender also to send data or messages with an informative or promotional content. Unlike known promotional and informative methods this has the major advantage that it only has to be processed electronically and does not have to be physically set up. There are therefore no production costs and storage or significant distribution costs. A sale can therefore be fully automated and an evaluation can be made of different additional forms of response on the part of the directly addressed traffic circles in question. The numbers of partially or fully completed downloads can be evaluated as an indicator of acceptance of a promotional measure. At present the impact of a promotional measure can only be measured on the basis of orders or at worst on the basis of complaints or aborted downloads.

According to the present invention the sender of an MM is then able to identify a component or in the case of a presentation a plurality of multimedia components of an MM as a signaling signal. A multimedia component or a plurality of components of an MM is identified as a signaling signal regardless of the medium type and medium format of the multimedia component. Even a signaling signal made up of a plurality of different components is played back immediately after delivery of the MM on the MMS User Agent of the recipient, to inform the recipient of the arrival of a new MM in one embodiment of the invention instead of a ringtone stored in the terminal. The form and scope of a signaling signal according to the invention no longer depend rigidly on individual recipient settings stored in a receiving device. According to the invention this method is independent of the nature of delivery, in order words it can be implemented in both PUSH and PULL modes. The present invention also does not provide for any restriction of audio content; rather it should be possible to identify a complete multimedia presentation as a signaling signal, in so far as it is a component of the MM. In practice individual announcement texts, melodies, images, video sequences or combinations of all these are feasible. With commercial MMs in particular a melody or jingle already known from the promotion or an already known logo of the company appearing as the sender can have an additional promotional effect. Also depending on the terminal, vibrations and/or other tactile signals can be used as a signaling signal or part of a signaling signal.

The present invention is described in more detail below with reference to the attached drawing and with reference to preferred embodiments. In the drawing:

FIG. 4 shows the coding of the new header field name as per variant a) according to the present invention;

Figure 1:
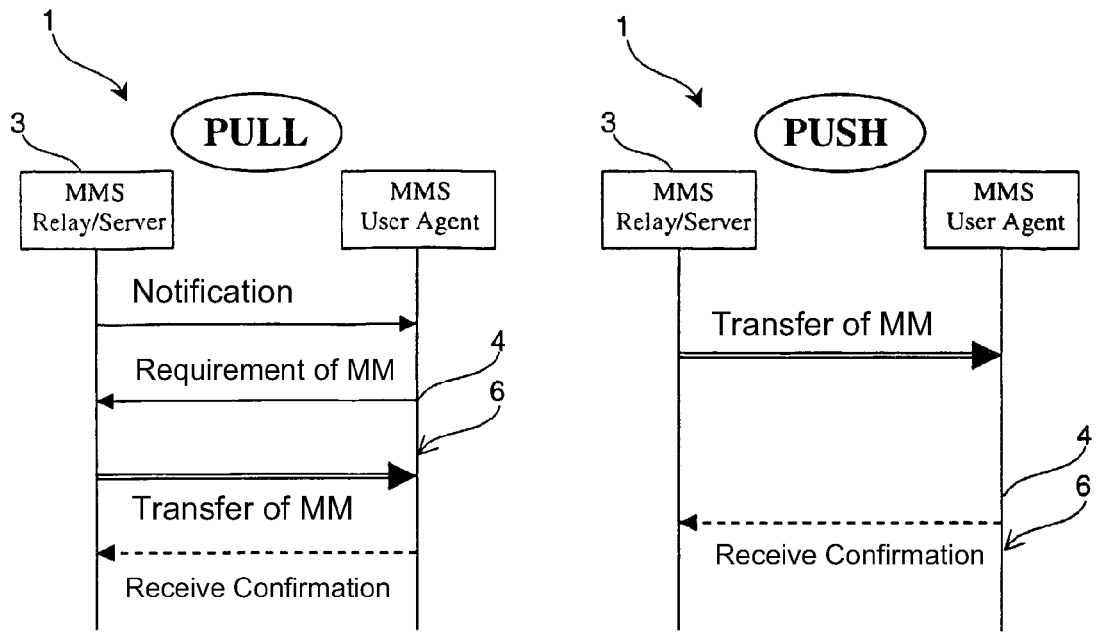
FIG. 1 shows a schematic comparison of the principles of PULL and PUSH modes.

FIG. 5 shows the coding of the header field X-Mms-Content-ID newly defined in the European patent application with application number EP 01 107 278.2 according to the second variant of this invention, variant b), and FIG. 6 shows the coding of the parameters according to the European patent application, application number EP 01 107 278.2 and of a newly defined parameter signaling element according to the second variant of the invention.

Elements with the same function and mode of operation have the same reference characters throughout FIGS. 1 to 6.

FIG. 1 shows a schematic comparison of the principles of PULL and PUSH modes for delivery of an MM in a communication system 1. The communication system 1 used as a basis below comprises at least three levels, specifically one level 2 as the level of a sender of the data or MM, a provider level 3 and a level 4 of a recipient receiving the MM sent from a subscriber terminal 5 on a subscriber terminal 6 or a telecommunications device designated as an MMS User Agent.

To show the differences between the principles of PULL and PUSH modes in the diagram in FIG. 1 only one provider level 3 and the level 4 of a recipient with the receiving subscriber terminal 6 MMS User Agent are shown. In what is known as PUSH mode an incoming MM is delivered immediately to the recipient. However with what is known as PULL mode the recipient is first informed of a newly arrived MM. The recipient can then decide for themselves whether or when they download this MM to their terminal. In PULL mode the recipient therefore has the option of remaining available for possibly more urgent or other more important MMs by postponing the download. Also downloads of large quantities of data can then be postponed to time slots charged at lower rates to save costs and improve the load on a provider's transmission channels. For PULL mode service however additional signals have to be generated and transmitted in the form of notification to the recipient and a request from this latter to transmit the MM.

Figure 2:
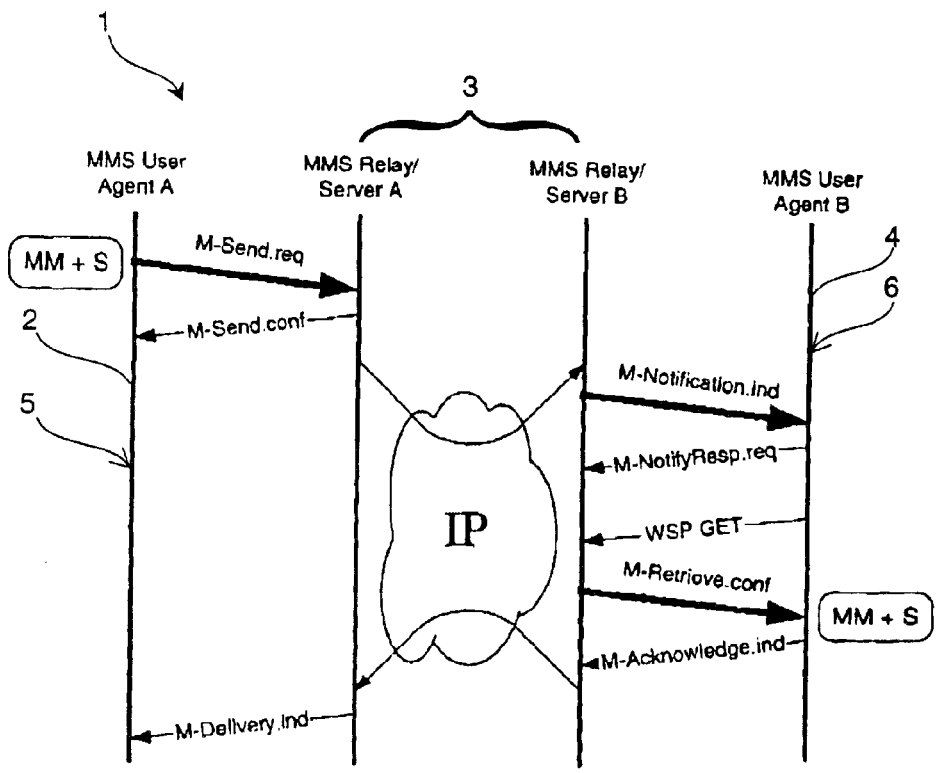
FIG. 2 shows a WAP MMS transaction flow diagram as a schematic illustration of a message assigned to a data transmission according to the wireless application protocol or WAP standard between sender level and provider level on the one hand and provider level and recipient level in PUSH mode on the other hand.

FIG. 2 shows a WAP MMS transaction flow diagram as a schematic illustration of a data transmission with assigned messages according to the wireless application protocol or WAP standard between sender level and provider level on the one hand and provider level and recipient level on the other hand. The levels referred to above with reference to the diagram in FIG. 1 are shown in full here. The provider level 3 is divided into two levels, in order to be able to differentiate between an MMS Relay/Server A responsible for the sender A and an MMS Relay/Server B responsible for the recipient. These two MMS Relays/Servers are connected to each other via an IP network according to an internet protocol, in which only a recoding operation is carried out just for transmission of the MM and the feedback data shown, which is not essentially of significance to the object of the present invention.

The exemplary embodiment in FIG. 2 discloses the application of the invention to a communication system 1 for the WAP standard, as used for example in the transmission of data in the Universal Mobile Telecommunication Standard UMTS. It is clear that the invention can also be used with other standards. Combined communication systems in particular are intended here, which comprise both mobile radio links and fixed network connections, etc.

As already disclosed above, for future methods, e.g. in the UMTS standard, what is known as a multimedia messaging service MMS is to be provided for the transmission of complex messages, the multimedia messages MMs, in addition to the previous short message service SMS. With this formatted texts and images can also be transmitted with and without sound. The restriction in SMS to a message length of 160 characters no longer applies. Transmission is possible for example of multipart and/or interlinked audio and video messages. MMS can be achieved by using WAP.

The communication system 1 comprises the level 2 of the data sender, also designated as MMS User Agent A. A provider level 3 is also provided, the network element of which implements the service and is hereafter designated as MMS Relay/Server. Finally the level 4 is provided as recipient level, said recipient being designated as MMS User Agent B. It is of course possible for there to be a plurality of providers in the level 3. This is for example possible if the data sender and selected recipient use different providers. These different providers can also be connected to each other by third providers as network operators.

An exchange of WAP messages is shown between four entities involved, MMS User Agent A, MMS Relay/Server A, MMS Relay/Server B and MMS User Agent B when an MM is sent or received. MMS User Agent refers to an application on a subscriber terminal that implements the MMS functionality. An MMS Relay/Server is a network element of an MMS Service Provider that supplies the MMS functionality to the MMS User Agents. The level 2 of the data sender comprises at least one subscriber terminal or telecommunication device 5, also the level 4 of the recipient comprises a subscriber terminal or telecommunication device 6. These telecommunication devices 5, 6 can for example be configured as standard mobile telephones or as devices with further input or display functions, such as laptops for example.

One condition for the implementation of the concept disclosed above for transmitting a signaling signal S that can be freely determined by a sender, is the possibility of being able to refer separately to the individual multimedia components of a message with multimedia content, in short a multimedia message MM, after editing or composition and identify them as a signaling signal S. Such identification should be sent to the recipient together with the MM. This requires modification of the WAP messages M-Send.req, M-Notification.ind and M-Retrieve.conf. The diagram in FIG. 2 shows the three WAP messages affected by this invention in what is known as the transaction flow diagram using bold arrows. The sequence of individual signals in the communication system 1 disclosed above is now described, as is required to send an MM from MMS User Agent A via the MMS Relay/Server A and MMS Relay/Server B to the MMS User Agent B in PUSH mode:

A multimedia message MM composed in the telecommunication device 5 of the sender or to be forwarded via this can contain one or a plurality of elements or data records, for example individual images, film sequences, texts or similar. The MM is first sent as a request message, designated as M-Send.req in the WAP protocol, from the level 2 to the provider MMS Relay/Server A in the level 3. From there the received message is acknowledged with an acknowledgement message M-send.conf to the sender of level 2.

The multimedia message MM is sent via an IP network from MMS Relay/Server A to MMS Relay/Server B, whereby the multimedia message MM can also be recoded in full or part. The MMS service provider of the recipient B generally knows which media types, e.g. still image, and media formats, e.g. JPEG, the MMS User Agent of the recipient B can process or display. Such information is exchanged while an MMS User Agent logs in with the MMS service provider responsible and is stored in the latter's area of responsibility, the Multimedia Messaging Service Environment MMSE. When an MMS service provider receives an MM, comprising an element of a medium type or medium format that the addressed MMS User Agent B is not able to process and/or play back, a file type or file format transcoding or conversion can take place before delivery of this MM in the MMSE of the MMS service provider of the recipient B.

According to this invention the identification of an MM element as a signaling signal S is not lost due to any transcoding or conversion operation that may be implemented. Some time after an information element M-Notification.ind is sent from the provider MMS Relay/Server B as notification to the recipient MMS User Agent B in level 4, with which this latter is informed that a multimedia message MM is waiting for them to download at the provider MMS Relay/Server B. In the PUSH mode shown in FIG. 2 the MMS User Agent B initiates the download of the MM without consultation with or acknowledgement by the person of the recipient.

The recipient receives the entire MM including the signaling signal S contained therein in the M-retrieve.conf. A message M-Acknowledge.ind acknowledges receipt of the MM. A final message M-Delivery.ind can send confirmation of receipt back from the level 3 to the sender MMS User Agent A in level 2.

Figure 3:
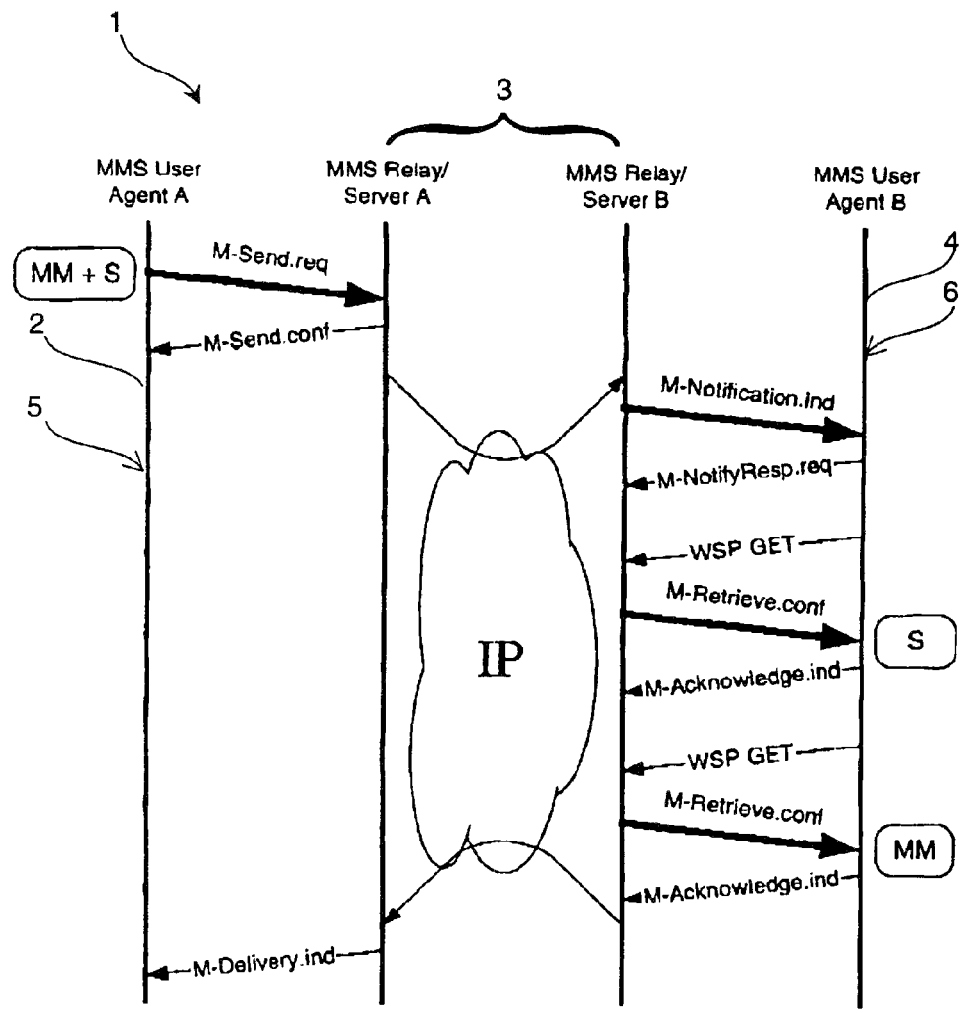
FIG. 3 shows a WAP MMS transaction flow diagram similar to the diagram in FIG. 2 to show a data transmission in PULL mode.

In contrast to this, in what is known as PULL mode according to FIG. 3, a distinction is made between the two scenarios discussed above in response to receipt of an M-Notification.ind:

1. A storage location for the signaling signal S is indicated in the message M-Notification.ind. During delivery of the signaling signal S in the M-retrieve.conf, a reference is also transmitted to the storage location of the remainder of the MM data. The MMS Relay/Server B is then informed as the remainder of the MM data is being downloaded that the elements of the signaling signal S have already been transmitted and no new transmission is necessary.
2. The storage locations of the signaling signal S and the remainder of the MM data are already contained in the M-Notification.ind, so this location information does not have to be sent again when transmitting the signaling signal S.

The signaling signal S is preferably downloaded without interaction with the person of the recipient.

The MM is only forwarded to the recipient MMS User Agent B from the provider MMS Relay/Server B with a message M-Retrieve.conf further to a request by the recipient B with a message WSP-GET. The recipient can in turn receive a signaling signal S that can however also be stored on an interim basis after first dispatch in the User Agent B application to relieve the load on the transmission channel. A message M-Acknowledge.ind acknowledges receipt of the MM in the level 4. A final message M-delivery.ind returns confirmation of receipt from the level 3 to the sender MMS User Agent A in level 2.

Header fields are used to manage the above messages, in other words fields inserted before the actual MM and/or individual elements of the MM, in which information about the origin, send time, file format, file size and further details can be contained. According to the invention the number of header fields is increased or the number of entries in a header field is changed. According to the invention such changes are used to identify at least one element as a component of a signaling signal S. Arrival of the MM should be indicated immediately by the signaling signal S as predefined by the sender MMS User Agent A on arrival of the M-Retrieve.conf. It is therefore possible in PULL mode for the signaling signal S to occur twice at B. This repetition of the signaling signal S produces a re-identification effect, which also indicates the already implemented download. A recipient therefore does not have to wait until the end of a very extensive and therefore long-lasting download in particular for the end and the possibility of playback.

Two principle possibilities are proposed above to identify a multimedia component as a signaling signal S. In the embodiment a) a new header field with the designation X-Mms-Signaling-Element is integrated into the header of an MM. According to embodiment b) a header field with the designation X-Mms-Content-ID is extended to include a parameter, with which an MM element is identified as a signaling signal S. The designation Signaling-Element is assigned to this parameter.

In the embodiment based on the binary coding of the messages exchanged in the MMS as defined by the WAP forum, the possibility of identification in the MM header is demonstrated according to both variants. Changes according to the invention are shown clearly by boxes.

The following scenario is hereby assumed:
User A, Andreas Schmidt, sends an MM to user B, Markus Trauberg. The MM, which comprises a text, a JPEG image and a melody in MP3 audio format, is collated by user A in the MMS User Agent A. User A wants the melody contained in the MM as a signaling signal S to inform the recipient of the arrival of this MM instead of a ring signal stored in the receiving device. According to the diagram in FIG. 2 the following messages are transmitted between the units with reference to the signaling signal S: M-Send.req, M-Notification.ind and M-Retrieve.conf. Both the variants of identification of components of a signaling signal S according to the invention as disclosed above are now set out briefly below with their essential content for a transmission in PUSH mode:

1. Initiation of an MM

Variant a:

In the WAP message M-Send.req, with which the MM is sent from the MMS User Agent A to the MMS Relay/Server A, the identification number of the element selected by the user A as the signaling signal can be input in the header field X-Mms-Signaling-Element introduced under a). This WAP message also contains the MM element identification fields defined in the patent application EP 01 101 057.6, [3]. The individual elements are described in detail in the header according to the patent application with application number EP 01 107 278.2, [6]. The header field X-Mms-Signaling Element is also included in the header area according to the diagram in FIG. 4. Here the header field X-Mms-Signaling Element refers as predefined above to the X-Mms-Content-ID <00714.1412.3> selected as the signaling signal, in which an audio file according to the MP3 standard is contained, as selected or determined by the sender.

| M-Send.req (MMS User Agent A -> MMS Relay/Server A): |
| --- |
| X-Mms-Message-Type: m-send-req |
| X-Mms-Transaction-ID: TRANSACTION-ID#1 |
| X-Mms-Version: 1.0 |
| Date: Wed, 28 Feb 2001 10:44:11 + 0100 |
| From: andreas.schmidt@sal.siemens.de |
| To: markus.trauberq@t-online.de |
| Re: Vacation greetings |
| X-Mms-Delivery-Report: Yes |
| ☐ X-Mms-Signaling-Element: <000714.1412.3> ☐ |
| Content-Type: Application/vnd.wap.multipart.related |
| nEntries: 3 |
| HeadersLen: XX |
| DataLen: XX |
| Content-Type: text/plain; |
| ☐ X-Mms-Content-ID: <000714.1412.1> ☐ |

| M-Send.req (MMS User Agent A -> MMS Relay/Server A): |
| --- |
| Hi Markus, |
| Vacation greetings. |
| The beach is great and the weather is fantastic. |
| See you next week, Andreas. |
| HeadersLen: XX |
| DataLen: 1265 |
| Content-Type: image/jpeg |
| ☐ X-Mms-Content-ID: <000714.1412.2> ☐ |
| ... |
| HeadersLen: XX |
| DataLen: 82345 |
| Content-Type: audio/mp3 |
| ☐ X-Mms-Content-ID: <000714.1412.3> ☐ |
| ... |

Variant b:

The WAP message M-Send.req, with which the MM is sent from the MMS

User Agent A to the MMS Relay/Server A, contains the header fields X-Mms-Content-ID extended according to [6]. Each of these header fields contains a set of parameters that is extended according to this invention to include a further parameter with the designation Signaling-Element, see variant b). The WAP message M-Send-req also contains the MM element identification fields defined in [3], so that each MM element can be addressed specifically, see diagrams in FIGS. 5 and 6.

| M-Send.req (MMS User Agent A -> MMS Relay/Server A): |
| --- |
| X-Mms-Message-Type: m-send-req |
| X-Mms-Transaction-ID: TRANSACTION-ID#1 |
| X-Mms-Version: 1.0 |
| Date: Wed, 28 Feb 2001 10:44:11 + 0100 |
| From: andreas.schmidt@sal.siemens.de |
| To: markus.trauberg@t-online.de |
| Re: Vacation greetings |
| X-Mms-Delivery-Report: Yes |
| ☐ X-Mms-Content-ID: <000714.1412.1>; ...; Signaling element=No |
| X-Mms-Content-ID: <000714.1412.2>; ...; Signaling element=No |
| X-Mms-Content-ID: <000714.1412.3>; ...; Signaling element=Yes ☐ |
| Content-Type: Application/vnd.wap.multipart.related |
| nEntries: 3 |
| HeadersLen: XX |
| DataLen: XX |
| Content-Type: text/plain; |
| ☐ X-Mms-Content-ID: <000714.1412.1> ☐ |
| Hi Markus, |
| Vacation greetings. |
| The beach is great and the weather is fantastic. |
| See you next week, Andreas. |
| HeadersLen: XX |
| DataLen: 1265 |
| Content-Type: image/jpeg |
| ☐ X-Mms-Content-ID: <000714.1412.2> ☐ |
| ... |
| HeadersLen: XX |
| DataLen: 82345 |
| Content-Type: audio/mp3 |
| ☐ X-Mms-Content-ID: <000714.1412.3> ☐ |
| ... |

2. After initiation of an MM

After successful transmission of the MM from the MMS User Agent A to the MMS Relay/Server A the MM is forwarded via an IP network (IP—Internet Protocol) to the MMS Relay/Server B of the recipient. It is generally first checked here whether the recipient's terminal can display or play back all the file types and formats contained in the MM. If necessary one or a plurality of MM elements are transcoded in the area of responsibility of the MMS service provider B. Notification of a newly arrived MM is then sent to the MMS User Agent B of the recipient (PULL mode) or the MM is delivered directly to the MMS User Agent B (PUSH mode).

3. Notification of an MM awaiting download

With this invention it is also possible to transmit to the MMS User Agent B with the notification the information that the MM awaiting download contains an element that is identified by the sender as a signaling signal. The MMS User Agent B can then initiate the specific download of the MM element identified as a signaling signal according to [3] without having to download the entire MM. In WAP the MMS User Agent B is informed about an MM awaiting download by the MMS Relay/Server B with the WAP message M-Notification.ind.

Variant a

The WAP message M-Notification.ind contains the header field X-Mms-Signaling-Element defined according to variant a), which contains the identification number of the element selected by user A as a signaling signal.

---

M-Notification.ind (MMS Relay/Server B -> MMS User Agent B):

X-Mms-Message-Type: m-notification-ind
X-Mms-Transaction-ID: TRANSACTION-ID#2
X-Mms-Version: 1.0
From: andreas.schmidt@sal.siemens.de
X-Mms-Message-Class: Personal
X-Mms-Message-Size: XX
X-Mms-Expiry: 3600
X-Mms-Content-Location: www.t-online.de/mms-inbox/mt01
Re: Vacation greetings
X-Mms-Signaling-Element: <000714.1412.3>
...

---

In PULL mode delivery of the signaling signal S can take place before delivery of the remaining elements of the MM or the complete MM. A link to the storage location of the remainder of the multimedia message MM in the MMS Relay/Server is then transmitted in the M-retrieve.conf.

Variant b:

The WAP message M-Notification.ind contains the extended header fields X-Mms-Content-ID according to [3] with the signaling element parameter newly defined in b), which can be used to identify an MM element as a signaling signal.

---

M-Notification.ind (MMS Relay/Server B ->MMS User Agent B):

X-Mms-Message-Type: m-notification-ind
X-Mms-Transaction-ID: TRANSACTION-ID#2
X-Mms-Version: 1.0
From: andreas.schmidt@sal.siemens.de
X-Mms-Message-Class: Personal
X-Mms-Message-Size: XX
X-Mms-Expiry: 3600
X-Mms-Content-Location: www.t-online.de/mms-inbox/mt01
Re: Vacation greetings

---

M-Notification.ind (MMS Relay/Server B ->MMS User Agent B):

X-Mms-Content-ID: <000714.1412.1>; ...; Signaling element=No
X-Mms-Content-ID: <000714.1412.2>; ...; Signaling element=No
X-Mms-Content-ID: <000714.1412.3>; ...; Signaling element=Yes
...

---

4. Delivery of the MM

Regardless, of the selected delivery mode (PULL or PUSH) the MM (or an individual element of an MM according to [3]) is transmitted from the MMS Relay/Server B with the WAP message M-Retrieve.conf to the MMS User Agent B.

Variant a:

In the WAP message M-Retrieve.conf use of the header field X-Mms-Signaling-Element defined in a) is proposed in combination with the MM element identification fields defined in [3]:

---

M-Retrieve.conf (MMS Relay/Server B ->MMS User Agent B):

X-Mms-Message-Type: m-retrieve-conf
X-Mms-Transaction-ID: TRANSACTION-ID#3
X-Mms-Version: 1.0
Date: Wed, 28 Feb 2001 11:02:26 + 0100
From: andreas.schmidt@sal.siemens.de
To: markus.trauberg@t-online.de
X-Mms-Message-ID: MESSAGE-ID#1
Re: Vacation greetings
X-Mms-Delivery-Report: Yes
X-Mms-Signaling-Element: <000714.1412.3>
Content-Type: Application/vnd.wap.multipart.related
nEntries: 3
HeadersLen: XX
DataLen: XX
Content-Type: text/plain;
X-Mms-Content-ID: <000714.1412.1>
Hi Markus,
Vacation greetings.
The beach is great and the weather is fantastic.
See you next week, Andreas.
HeadersLen: XX
DataLen: 1265
Content-Type: image/jpeg
X-Mms-Content-ID: <000714.1412.2>
...
HeadersLen: XX
DataLen: 82345
Content-Type: audio/mp3
X-Mms-Content-ID: <000714.1412.3>
...

---

Variant b)

In the WAP message M-Retrieve.conf use of the parameter set extended to include the new entry signaling element is proposed in every X-Mms-Content-ID header field in combination with the MM element identification fields defined in [3]:

---

M-Retrieve.conf (MMS Relay/Server B ->MMS User Agent B):

X-Mms-Message-Type: m-retrieve-conf
X-Mms-Transaction-ID: TRANSACTION-ID#3
X-Mms-Version: 1.0
Date: Wed, 28 Feb 2001 11:02:26 + 0100

-continued

M-Retrieve.conf (MMS Relay/Server B ->MMS User Agent B):

From: andreas.schmidt@sal.siemens.de
To: markus.trauberg@t-online.de
X-Mms--ID: MESSAGE-ID#1
Re: Vacation greetings
X-Mms-Delivery-Report: Yes
Content-Type: Application/vnd.wap.multipart.related
nEntries: 3
HeadersLen: XX
DataLen: XX
Content-Type: text/plain;

X-Mms-Content-ID: <000714.1412.1>; ...; Signaling element=No

Hi Markus,
Vacation greetings.
The beach is great and the weather is fantastic.
See you next week, Andreas.
HeadersLen: XX
DataLen: 1265
Content-Type: image/jpeg X-Mms-Content-ID: <000714.1412.2>; ...; Signaling element=No

...

HeadersLen: XX
DataLen: 82345
Content-Type: audio/mp3

X-Mms-Content-ID: <000714.1412.3>; ...; Signaling element=Yes

...

5. After Delivery of an MM

Immediately after the successful delivery of an MM to the MMS User Agent B of the recipient the header fields in the WAP message M-Retrieve.conf have to be examined to establish whether an MM element has been identified as a signaling signal. If so, instead of a signaling signal preset by the user B and stored in the terminal, the correspondingly identified MM element is played back.

Variant a:

In the WAP message M-Retrieve.conf the header field with the designation X-Mms-Signaling-Element must be searched. An MM element is referred to via the MM element identification fields defined in [3].

Variant b:

In the WAP message M-Retrieve.conf all header fields with the designation X-Mms-Content-ID must be searched and evaluated. The parameter value of the parameter signaling element thereby indicates whether the corresponding MM element is a signaling signal or not.

In this example user B hears the mp3 audio file selected by the user A as the signaling signal S in both variants.

The further messages of an MMS implementation according to the diagrams in FIG. 2 and FIG. 3 remain unaffected by this invention and are not shown here.

To summarize, different possibilities are presented above for initiating an immediate and automatic display of an element on receipt of an MM by a recipient by identifying the relevant element as a signaling signal together with some of the respective advantages. The variants a) and b) are based on the patent application with application number EP 01 101.057.6, [3]. Variant a) is more easily integrated in the existing WAP implementation of the MMS than variant b), which is also based on the patent application with application number EP 01 101 278.2, [6] in addition to the patent application with application number EP 01 107 057.6.

Background data on WAP, MMS and prior applications is summarized along with the quoted references above in the following in particular:

[1] GSM 03.40 version 7.4.0, release 1998; Digital Cellular Telecommunications System; Technical realization of the Short Message Service (SMS);

[2] 3GPP TS 22.140 version 4.1.0, release 4 Mar. 2001; Third Generation Partnership Project; Multimedia Messaging Service (MMS); Service Aspects; Stage 1; 3GPP TS 23.140 version 4.3.0, release 4, June 2001; Third Generation Partnership Project; Technical Specification Group Terminals; Multimedia Messaging Service (MMS); Functional Description; Stage 2.

[3] Trauberg, M et al.: Verfahren zur detailierten Benachrichtigung eines Empfängers einer Multimedia Message mit Informationen über die einzelnen Bestandteile der Message im Multimedia Messaging Service (MMS) der dritten Mobilfunkgeneration and zum gezielten Herunterladen einzelner Bestandteile einer Message [Method for detailed notification of a recipient of a multimedia message with information about the individual components of the message in the multimedia messaging service (MMS) of the third mobile radio generation and on the specific downloading of individual components of a message], patent application with application number EP 01 101 057.6.

[4] WAP-209-MMS Encapsulation; Wireless Application Protocol; WAP Multimedia Messaging Service; Message Encapsulation; MMS proposed version, June 2001.

[5] WAP-203-WSP, version 4 May 2000; Wireless Application Protocol, Wireless Session Protocol Specification; Chapter 8.4: "Header Encoding".

[6] Trauberg, M et al.: Verfahren zur detailierten Benachrichtigung eines Empfangers einer Multimedia Message im Multimedia Messaging Service (MMS) [Method for detailed notification of a recipient of a multimedia message in the multimedia messaging service (MMS)], patent application with application number EP 01 107 278.2

The following abbreviations, acronyms and definitions were used in particular in the context of the exemplary embodiments disclosed above.

| | |
|---|---|
| GSM | Global System for Mobile Communication |
| MM | Multimedia Message |
| MMS | Multimedia Messaging Service |
| SMS | Short Message Service |
| UMTS | Universal Mobile Telecommunication System |
| WAP | Wireless Application Protocol |
| WSP | Wireless Session Protocol |
| MMSE | Multimedia Messaging Service Environment |
| 1 | Communication system |
| 2 | Data sender level |
| 3 | Provider level |
| 4 | Recipient level |
| 5 | Subscriber terminal/telecommunication device |
| 6 | Subscriber terminal/telecommunication device |
| A | Sender |
| B | Recipient |
| S | Signaling signal |

MMS-specific abbreviations:

| | |
|---|---|
| MMS User Agent A | Sender application (FIG. 2) |
| MMS User Agent B | Recipient application (FIG. 2) |
| M-Relay/Server | MMS connection unit/provider |
| M-Send.req | MMS send request |
| M-Send.conf | MMS send confirmation |
| M-Notification.ind | MMS recipient notification |
| M-NotifyResp.req | MMS recipient notification confirmation |
| WSP GET | MMS delivery request |
| M-Retrieve.conf | MMS delivery message |
| M-Acknowledge.ind | MMS delivery confirmation |
| M-Delivery.ind | MMS delivery status notification |
| IP Network according to an internet protocol | |

The invention claimed is:

1. A method for transmitting a multimedia message with a plurality of multimedia components from a sender to a recipient in a communication system, the method comprising the steps of:
specifying, via at least one multimedia component of the multimedia message, an immediate display of the at least one multimedia component one of before and on arrival of the remaining multimedia components;
identifying, by a sender, a predefined subset of the multimedia components of the multimedia message as a signaling signal;
transmitting information to a recipient with the aid of a notification signal, wherein the notification signal indicates that the multimedia message is ready in the communication system for downloading, and wherein the multimedia message ready for downloading comprises at least one multimedia component which has been identified as a signaling signal;
initiating one of immediate and preferred downloading when the notification signal is received by the recipient, showing that a multimedia component is identified within the multimedia message ready for downloading as a signaling signal.

2. The method for transmitting a multimedia message as recited in claim 1, wherein the signaling signal is delivered to the recipient one of before and on arrival of the remaining multimedia components of the multimedia message or of the complete multimedia message and thereafter is immediately played back.

3. The method for transmitting a multimedia message as recited in claim 1, wherein the multimedia message with a multimedia signaling signal is first inserted before one of an incoming call and incoming multimedia data transmission in order to signal the one of the incoming call and the incoming multimedia data.

4. The method for transmitting a multimedia message as recited in claim 1, wherein one of optical, acoustic and tactile multimedia components are played back by the signaling system.

5. The method for transmitting a multimedia message as recited in claim 1, wherein information about the size of the data, awaiting transmission, for the multimedia message to be transmitted is added to the signaling signal.

6. The method for transmitting a multimedia message as recited in claim 1, wherein the signaling signal delivered to the recipient is used as an aid in deciding whether the multimedia components of the multimedia message are downloaded immediately to the recipient (6).

7. The method for transmitting a multimedia message as recited in claim 1, wherein the multimedia message with the multimedia component identified as a signaling signal is sent by the sender to a MMS Relay/Server responsible for the sender.

8. The method for transmitting a multimedia message as recited in claim 7, wherein identification of the multimedia component is coded in data that is sent from a sending MMS User Agent of the sender to the MMS Relay/Server responsible for the sender in order to send the multimedia message.

9. The method for transmitting a multimedia message as recited in claim 7, wherein the multimedia message with the multimedia component identified as a signaling signal is passed by the MMS Relay/Server responsible for the sender to an MMS Relay/Server responsible for the recipient.

10. The method for transmitting a multimedia message as recited in claim 9, wherein the notification signal is sent by the MMS Relay/Server responsible for the recipient to the recipient, wherein the recipient is informed that the multimedia message is ready to download in the MMS Relay/Server, and that the multimedia message ready for downloading contains at least one multimedia component which has been identified by the sender as a signaling signal.

11. The method for transmitting a multimedia message as recited in claim 9, wherein the identification of the multimedia component is coded in the data that is sent from the MMS Relay/Server assigned to the recipient to a receiving MMS User Agent of the recipient in order to notify the receiving User Agent of the presence of the multimedia message.

12. The method for transmitting a multimedia message as recited in claim 9, wherein the identification of the multimedia component is coded in the data that is sent from the Relay/Server assigned to the recipient to a receiving MMS User Agent of the recipient in order to deliver the multimedia message.

13. The method for transmitting a multimedia message as recited in claim 1, wherein a storage location of the signaling signal is displayed to the recipient in the notification signal.

14. The method for transmitting a multimedia message as recited in claim 13, wherein a reference to the storage location of the remaining multimedia components of the waiting multimedia message is also transmitted to the recipient in the delivery signal when the signaling signal is delivered.

15. The method for transmitting a multimedia message as recited in claim 13, wherein the storage locations of the signaling signal and of the remaining multimedia components of the waiting multimedia message are transmitted to the recipient in the notification signal.

16. The method for transmitting a multimedia message as recited in claim 1, wherein the download of the signaling signal takes place without interaction with the recipient.

17. The method for transmitting a multimedia message as recited in claim 1, wherein an additional header field is integrated into the header of the multimedia message to be transmitted in order to identify the multimedia component as a signaling signal.

18. The method for transmitting a multimedia message as recited in claim 17, wherein the coding of the header field is carried out as coding of one of the field name and of the field value.

19. The method for transmitting a multimedia message as recited in claim 17, wherein the additional header field is inserted into one of a WAP messages M¬Send.req, M-Notification.ind and M-Retrieve.conf of the communication system with the designation X-Mms-Signaling-Element.

20. The method for transmitting a multimedia message as recited in claim 19, wherein the header field X-Mms-Signaling-Element is coded as 0x87.

21. The method for transmitting a multimedia message as recited in claim 19, wherein the value of the header field X-Mms-Signaling-Element is coded as a text string.

22. The method for transmitting a multimedia message as recited in claim 19, wherein a parameter set in the header field of one of the WAP messages M-Send.req, M-Notification.ind and M-Retrieve.conf with the designation X-Mms-Content-ID is extended to include an additional parameter with the designation Signaling-Element, by means of which at least one multimedia component of the multimedia message to be transmitted is identified as a signaling signal.

23. The method for transmitting a multimedia message as recited in claim 19, wherein the header field in WAP is coded performing one of the following steps:
   coding of the field name X-Mms-Content ID as 0x19; and
   coding of the field value of X-Mms-Content ID as a text string with 25 designation of at least one multimedia component of the multimedia message to be transmitted.

24. The method for transmitting a multimedia message as recited in claim 19, wherein the header field of the multimedia message to be transmitted is evaluated by the MMS service provider of the recipient in order to find out whether the respective multimedia message present contains a multimedia component which has been identified as a signaling signal.

25. The method for transmitting a multimedia message as recited in claim 1, further comprising the steps of adapting the identified multimedia component of the respective multimedia message to be transmitted, for transmission to the recipient.

26. The method for transmitting a multimedia message as recited in claim 1, wherein the multimedia component is identified as a signaling signal in the multimedia message to be transmitted as being resistant to any conversion of one of medium type and medium format.

27. The method for transmitting a multimedia message as recited in claim 1, wherein the multimedia component of the respective multimedia message to be transmitted identified by the sender as a signaling signal, replaces a signalling signal preset by the recipient.

28. The method for transmitting a multimedia message as recited in claim 11, wherein the signaling signal is extracted from the respective multimedia message to be transmitted by one of the receiving MMS User Agent of the recipient, the sender-side MMS Relay/Server and the receive-side MMS Relay/Server.

29. The method for transmitting a multimedia message as recited in claim 1, wherein the signaling signal accesses multimedia components which are one of (a) permanently preinstalled in the equipment of the recipient, and (b) stored as a result of a previous transmission so that only changes to these multimedia components are transmitted.

30. The method for transmitting a multimedia message as recited in claim 1, wherein the sender and recipient comprise respective WAP-capable mobile terminals.

31. A communication system for transmitting a multimedia message with a plurality of multimedia components, comprising:
   means for specifying, via at least one multimedia component of the multimedia message, an immediate display of the at least one multimedia component one of before and on arrival of the remaining multimedia components;
   means for identifying, by a sender, a predefined subset of the multimedia components of the multimedia message as a signaling signal;
   means for transmitting information to a recipient with the aid of a notification signal, wherein the notification signal indicates that the multimedia message is ready in the communication system for downloading, and wherein the multimedia message ready for downloading comprises at least one multimedia component which has been identified as a signaling signal;
   means for initiating one of immediate and preferred downloading when the notification signal is received by the recipient, showing that a multimedia component is identified within the multimedia message ready for downloading as a signaling signal.

* * * * *